US005969045A

United States Patent [19]
Schmitz et al.

[11] Patent Number: 5,969,045
[45] Date of Patent: *Oct. 19, 1999

[54] CHLORINATED POLYVINYL CHLORIDE COMPOUNDS HAVING IMPROVED STABILITY, TOUGHNESS AND A LOW RATE OF HEAT RELEASE AND SMOKE GENERATION

[75] Inventors: Theodore Joseph Schmitz, Avon; David Lee Milenius; Thomas Henry Forsyth, both of Rocky River; Arthur Leonard Backman, Brecksville; Girish Trikamlal Dalal, Avon Lake, all of Ohio

[73] Assignee: The B.F. Goodrich Company, Akron, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/859,633

[22] Filed: May 20, 1997

Related U.S. Application Data

[63] Continuation of application No. 08/590,807, Jan. 24, 1996, abandoned, which is a continuation of application No. 08/286,727, Aug. 5, 1994, abandoned.

[51] Int. Cl.$^6$ .................................................... C08K 5/54
[52] U.S. Cl. .......................... 525/104; 525/101; 524/267; 524/269
[58] Field of Search ................................ 525/104, 101; 524/267, 269

[56] References Cited

U.S. PATENT DOCUMENTS

| | | |
|---|---|---|
| 2,996,489 | 8/1961 | Dannis et al. . |
| 3,100,762 | 8/1963 | Shockney . |
| 3,264,375 | 8/1966 | Jones . |
| 3,334,077 | 8/1967 | Gateff . |
| 3,334,078 | 8/1967 | Gasteff . |
| 3,453,347 | 7/1969 | Dreyfuss et al. . |
| 3,506,637 | 4/1970 | Makino et al. . |
| 3,534,013 | 10/1970 | Wakabayashi et al. . |
| 3,591,571 | 7/1971 | Steinbach-Van Gaver . |
| 4,032,594 | 6/1977 | Serratore et al. ........................ 525/74 |
| 4,049,517 | 9/1977 | Adachi et al. ............................ 526/17 |
| 4,173,598 | 11/1979 | Castelazo et al. ....................... 525/80 |
| 4,335,032 | 6/1982 | Rosenquist .............................. 524/269 |
| 4,350,798 | 9/1982 | Parker ..................................... 525/330 |
| 4,362,845 | 12/1982 | Kamata et al. .......................... 525/57 |
| 4,377,459 | 3/1983 | Parker ..................................... 525/192 |
| 4,381,361 | 4/1983 | Hardt et al. ............................. 524/265 |
| 4,412,898 | 11/1983 | Olson et al. ........................... 525/331.6 |
| 4,443,585 | 4/1984 | Goldman ................................ 525/310 |
| 4,459,387 | 7/1984 | Parker ................................... 525/331.6 |
| 4,680,343 | 7/1987 | Lee ......................................... 525/148 |
| 4,745,156 | 5/1988 | Yoshihara et al. ...................... 525/192 |
| 4,894,415 | 1/1990 | Sasaki et al. ............................ 525/68 |
| 4,918,132 | 4/1990 | Hongo et al. ........................... 524/504 |
| 4,994,522 | 2/1991 | Sasaki et al. ............................ 525/63 |
| 5,132,359 | 7/1992 | Sasaki et al. ............................ 525/63 |
| 5,216,088 | 6/1993 | Cinadr et al. ........................... 525/356 |
| 5,268,424 | 12/1993 | Lawson .................................. 525/133 |
| 5,334,656 | 8/1994 | Yamamoto et al. ...................... 525/63 |
| 5,340,880 | 8/1994 | Backman et al. ..................... 525/331.6 |
| 5,359,022 | 10/1994 | Mautner et al. ......................... 528/23 |
| 5,362,795 | 11/1994 | Matsumoto et al. .................... 524/501 |
| 5,789,453 | 8/1998 | Detterman ................................ 521/92 |
| 5,804,655 | 9/1998 | Miyatake et al. ........................ 525/69 |
| 5,821,304 | 10/1998 | Backman et al. ....................... 525/101 |

FOREIGN PATENT DOCUMENTS

| | | |
|---|---|---|
| 260552 | of 1988 | European Pat. Off. . |
| 0 3808871 | 3/1989 | European Pat. Off. . |
| 0308871 | 3/1989 | European Pat. Off. . |
| 0326041 | 8/1989 | European Pat. Off. . |
| 4-306252 | 10/1992 | Japan . |

OTHER PUBLICATIONS

Translation of Japanese Kobunshi Ronbunshu, "Synthesis and Analysis of Morphology of Silicone/Acryl Compound Rubber", vol. 50, No. 5, pp. 391–395 (May, 1993).
Technical Bulletin S–1, Metablen™ S–2001, "Super–Hi Impact/Super–Weather–Resistant Modifer for PVC", Mitsubishi Rayon Company, Ltd.
Material Safety Data Sheet, Elf Atochem North America, Philadelphia, PA, Jun. 4, 1992.
Elf Atochem North America, Inc., Information for CPVC/S–2001 Blends, Data 1, 2 and 3.
Material Safety Data Sheet and Raw Material Specification Form with cover sheet from Elf Atochem, Mitsubishi Rayon Co., Ltd., Feb. 3, 1992.
Raw Material Specification Form, Mitsubishi Rayon Co., Ltd. dated Mar. 1993.
9 Sheets of Graphs, date unknown, on Various Properties of Metablen S–2001.
Data Sheets on Glass Ratio and Yellow Index of PVC Sample Sheets exposed in Okinawa.
2 Sheets of DSC data from Metablen S–2001.
7 Sheets of Data onizod Impact Strength, Weatherability, Heat Discoloration, Impact Modification for Metablen S–2001, dated Sep., 1992.
Abstract—Database WPI, Section Ch, Week 9222, Derwent Publications Ltd., GB; Class A14, AN 92–178306 & JP–A–04 110 338 (Tokuyama Soda KK), Apr. 10, 1992.
Hackh'Chemical Dictionary, 1944.

*Primary Examiner*—Margaret G. Moore
*Attorney, Agent, or Firm*—Helen A. Odar

[57] ABSTRACT

The present invention relates to thermoplastic polymer compounds comprising a blend of a chlorinated polyvinyl chloride and an impact modifier containing a polyorganosiloxane and polyalkyl(meth)acrylate. The novel thermoplastic compound has improved stability and toughness and exhibits a low rate of heat release.

19 Claims, No Drawings

CHLORINATED POLYVINYL CHLORIDE COMPOUNDS HAVING IMPROVED STABILITY, TOUGHNESS AND A LOW RATE OF HEAT RELEASE AND SMOKE GENERATION

This is a continuation of application Ser. No. 08/590,807, filed Jan. 24, 1996, now abandoned, which is a continuation of application Ser. No. 08/286,727, filed Aug. 5, 1994, now abandoned.

FIELD OF INVENTION

The present invention relates to thermoplastic polymer compounds comprising a blend of a chlorinated polyvinyl chloride and an impact modifier containing a polyorganosiloxane. This novel thermoplastic compound has improved stability and toughness and exhibits a low rate of heat release, and smoke generation as compared to conventional impact modified chlorinated polyvinyl chloride compounds. The thermoplastic compound can be used to form articles.

BACKGROUND OF THE INVENTION

It is well known to the art and literature that a chlorinated vinyl polymer referred to as chlorinated polyvinyl chloride, hereinafter CPVC, has excellent high temperature performance characteristics, among other desirable physical properties. Typically, commercial CPVC has about 57 percent to about 69 percent by weight of bound chlorine, and is most conveniently prepared by the chlorination of polyvinyl chloride (hereinafter PVC) as described in U.S. Pat. Nos. 2,996,489; 3,100,762; 3,334,077; 3,334,078; 3,506,637; 3,534,013; 3,591,571; 4,049,517. U.S. Pat. No. 5,216,088 describes a two step process for forming CPVC containing at least 70 percent by weight chlorine.

The term CPVC is used herein to define a chlorinated vinyl chloride polymer having in excess of about 57 percent by weight of bound chlorine based upon the total weight the polymer. CPVC has become an important specialty polymer due to its relatively low cost, high glass transition temperature, high heat distortion temperature, outstanding flame and smoke properties, chemical inertness, and low sensitivity to hydrocarbon feed stock costs. The glass transition temperature of CPVC generally increases as the percentage of chlorine increases. However, as the chlorine content increases, the CPVC resin becomes more difficult to process. In addition, a well known undesirable characteristic of CPVC resin is that it inherently has low impact properties, a characteristic which is also common to vinyl chloride homopolymers.

The poor processability of CPVC resins is exemplified by milling CPVC on a two roll mill at elevated temperatures which results in high torque and high temperatures as well as decomposition of the CPVC. Softening additives or plasticizers have been added to CPVC in order to improve its processability. Although its processability is somewhat improved, these additives produce undesirable effects. Some of the more significant detrimental effects produced by inclusion of these softening or plasticizer additives are lower heat distortion temperatures, softness and weakness in terms of lower tensile strength, and less desirable chemical properties than those exhibited by CPVC alone. These negative attributes of the additives on CPVC impede the usefulness of the modified CPVC in the manufacture of rigid plastic articles.

The increasing demand for CPVC pipes, vessels, valve bodies and fittings, and the fact that an impact-deficient CPVC matrix can be improved by compounding and blending it with other polymers, has instigated concerted efforts to develop better impact modified compounds. Most of these efforts have been channeled toward rigid CPVC applications where acceptable impact strength and dimensional stability under heat are critical. These include the manufacture of exterior structural products, rigid panels, pipes and conduits, injection-molded and thermoformed industrial parts, appliance housings, and various other types of containers, both large and small.

U.S. Pat. No. 3,264,375 to Robert W. Jones relates to rubber-modified styrene-type polymers. More particularly, the Jones Patent relates to processes for preparing such materials and for producing rubber-in-monomer solutions to be employed in preparing such materials.

U.S. Pat. No. 4,173,598 to Castelazo et. al. relates to processes for making polymeric compositions which have methacrylic and/or acrylic chains grafted onto a copolymerized vinyl diene substrate. The compositions are particularly useful as impact modifiers for polyvinyl chlorides.

U.S. Pat. No. 4,362,845 to Kamata et. al. relates to a composition with high impact resistance and little fish eyes content, comprising 97 to 60 parts by weight of a polyvinyl chloride-base resin and 3 to 40 parts by weight of a graft copolymer obtained by the three-stage graft polymerization of 65 to 25 parts by weight of a monomer combination (B) comprising 12 to 57 percent by weight of methyl methacrylate, 1 to 24 percent by weight of at least one of alkyl acrylates having a $C_{1-18}$-alkyl group, 80 to 40 percent by weight of styrene and 0 to 3 percent by weight of a polyfunctional crosslinking agent having one or more alkyl groups in the molecule onto 35 to 75 parts by weight of a butadiene-base elastomer (A) containing 30 percent by weight or more of 1,3-butadiene units.

Although the impact modified CPVC compounds described above are useful, the compounds contain carbon based impact modifiers and therefore provide more fuel to increase the rate of heat release and smoke generation when the compounds are burned. The addition of these types of impact modifiers to CPVC therefore produces less desirable properties in the compound than CPVC alone.

Therefore, a thermoplastic polymer compound comprising chlorinated polyvinyl chloride and an impact modifier having improved properties is desired. Preferably, the thermoplastic polymer compound will have increased stability, toughness and a low rate of heat release and smoke generation.

SUMMARY OF THE INVENTION

The present invention provides a novel thermoplastic polymer compound comprising CPVC and an impact modifier containing a polyorganosiloxane. The novel compound has improved stability, and toughness and a low level of heat release, and smoke generation.

It is a further aspect of the present invention to provide an article made from this novel thermoplastic polymer compound.

DETAILED DESCRIPTION

The thermoplastic polymer compound of the present invention generally comprises a chlorinated polyvinyl chloride, and an impact modifier containing a polyorganosiloxane.

The chlorinated polyvinyl chloride useful in this invention includes any post-chlorinated polyvinyl chloride containing at least 58 percent by weight of bound chlorine based upon the total weight of the CPVC. The CPVC resins desirably contain from about 58 percent to about 72 percent of chlorine by weight and preferably from about 63 percent to about 72 percent of chlorine by weight. It is to be noted that when a CPVC resin having a degree of chlorination within the preferred range of from about 63 percent to about 72 percent of chlorine by weight is utilized, CPVC displays properties quite different than those of PVC. These properties include increased glass transition temperature, increased tensile strength, and an increased melting point.

CPVC referred to in this specification can generally be obtained from a PVC homopolymer. CPVC, also within the purview of the present invention, may be derived from a PVC copolymer having up to 5 parts of comonomer per 100 parts by weight of vinyl chloride monomer. For example, vinyl chloride can advantageously be polymerized in the presence of a chain terminating co-reactant such as a solvent, an ethylene unsaturated alkylene such as an alpha olefin or a reactive mercaptan such as 2-mercapto ethanol. Where the precursor PVC contains less than about 5 parts total of one or more comonomers per 100 parts of vinyl chloride, this polymer is described in the term of art as a homopolymer.

CPVC is known to the art and to the literature and is commercially available from several sources. CPVC can be made according to any commercial process or the like such as by a solution process, a fluidized bed process, a water slurry process, a thermal process, or a liquid chlorine process. The preferred process is an aqueous suspension process. Inasmuch as CPVC resins are known to the art as well as to the literature, they will not be discussed in great detail herein. Rather, reference is hereby made to U.S. Pat. Nos. 2,996,049; 3,100,762; 4,412,898 and 5,216,088, which are hereby fully incorporated by reference with regard to suitable types of CPVC which can be utilized, as well as to methods of preparation and the like. The CPVC resins which can be utilized in the present invention generally have a fused density of from about 1.45 to about 1.68 grams/cc at 25° C. and a glass transition temperature (Tg) of from about 95° to about 200° C. The preferred CPVC resins have fused densities in the range of from about 1.51 to about 1.65 grams/cc at 25° C. and a glass transition temperature of at least 1 00°C.

According to the present invention, CPVC used in the compound can be blended with or contain generally small amounts of PVC and/or PVC copolymers. The amount of the vinyl chloride homopolymer, a copolymer made from vinyl chloride-vinyl type comonomer, or blends thereof, can be up to about 25% by weight, desirably up to about 10% by weight, and preferably nonexistent based upon 100 parts by weight of the CPVC on the one hand and the vinyl chloride homopolymer, the vinyl copolymer of vinyl chloride-vinyl type comonomer, or blends thereof, on the other hand.

When copolymers of vinyl chloride-vinyl type comonomer are utilized, the vinyl type comonomers are generally well known to the art and to the literature and include esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate, ethyl methacrylate, butyl methacrylate, and the like; styrene and styrene derivatives having a total of from 8 to 15 carbon atoms such as alphamethylstryene, vinyl toluene, chlorostyrene; vinyl naphthalene; diolefins having a total of from 4 to 8 carbon atoms such as butadiene, isoprene, and including halogenated diolefins such as chloroprene; monoolefins having from 2 to 10 carbon atoms, desirably 2 to 4 carbon atoms and preferably 4 carbon atoms, with isobutylene being highly preferred; and mixtures of any of the above types of monomers and other monomers copolymerizable therewith as are known to the art and to the literature. An amount of vinyl chloride comonomer is utilized to produce a vinyl chloride-vinyl type copolymer containing from about 30 percent of vinyl chloride comonomer to about 99 or 100 percent based upon the total weight of the vinyl chloride-vinyl type copolymer, and preferably from about 20 percent of the vinyl chloride comonomer to about 99 or 100 percent by weight of the copolymer. The remainder of the copolymer is comprised of one or more of the above-noted vinyl-type comonomers, for example vinyl acetate. Thus, an amount of vinyl-type comonomer when utilized to produce a vinyl chloride-vinyl-type copolymer is up to about 30 percent and preferably up to about 20 percent by weight of the copolymer.

It is further contemplated in the present invention that CPVC can be blended with a CPVC copolymer. The amount of the CPVC copolymer, which is made by chlorination of the vinyl type comonomers listed in the immediately preceding paragraph, or blends thereof, can be up to about 30 percent by weight, and preferably up to about 20 percent by weight based on 100 parts by weight of the CPVC on the one hand and the CPVC copolymer on the other hand. However, the total amount of the PVC, PVC copolymers, and/or CPVC copolymers is not to exceed up to about 35 percent based on 100 parts by weight of the CPVC on the one hand, and the PVC, PVC copolymer, and/or CPVC copolymer on the other hand.

Any impact modifier containing a polyorganosiloxane can be used in the present invention. The preferred impact modifier is composed of a mixture of a polyorganosiloxane and a polyalkyl(meth)acrylate. Preferably, the impact modifier contains about 10–90% by weight of the polyorganosiloxane and from about 10 to 90% by weight of a polyalkyl (meth)acrylate.

The polyorganosiloxane may be prepared by emulsion polymerization using an organosiloxane and a crosslinking agent as described hereinafter. At that time, a grafting agent may further be used.

The organosiloxane may be various types of cyclic siloxanes of at least three-membered ring, preferably from 3- to 6-membered cyclosiloxanes. For example, it is believed hexamethylcyclotrisiloxane, octamethylcyclotetrasiloxane, decamethylcyclo-pentasiloxane, dodecamethylcyclohexasiloxane, trimethyltriphenylcyclotrisiloxane, tetramethyltetraphenyl-cyclotetrasiloxane and octaphenylcyclotetrasiloxane can be used. These organosiloxanes may be used alone or in combination as a mixture of two or more different types. The organosiloxane is used in an amount of at least 50% by weight, preferably at least 70% by weight of the polyorganosiloxane.

The crosslinking agent for the organosiloxane may be a trifunctional or tetrafunctional silane type crosslinking agent such as trimethoxymethylsilane, triethoxyphenylsilane, tetramethoxysilane, tetraethoxysilane, tetra-n-propoxysilane or tetrabutoxysilane. Tetrafunctional crosslinking agents are particularly preferred, and among them tetraethoxysilane is especially preferred. The crosslinking agent is used usually in an amount of from 0.1 to 30% by weight in the polyorganosiloxane.

The grafting agent for the organosiloxane may be a compound capable of forming a unit represented by the formula:

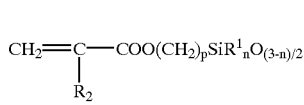 (I-1)

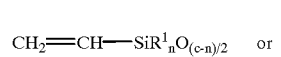 or (I-2)

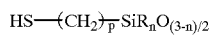 (I-3)

wherein $R^1$ is a methyl group, an ethyl group, a propyl group or a phenyl group. $R^2$ is a hydrogen atom or a methyl group, n is 0, 1 or 2, and p is a number o from 1 to 6.

The polyorganosiloxane can be prepared by any method in which the organosiloxane, the crosslinking agent and optionally the grafting agent are mixed. The preparation is well within the scope of one of ordinary skill in the art, and does not form part of this invention.

The polyorganosiloxane can be compounded with (meth) acryloyloxysiloxane capable of forming the unit of the formula (I-1). A methacryloyloxysilane is particularly preferred as the compound capable of forming the unit of the formula (I-1). Specific examples of the methacryloyloxysilane include β-methacryloyloxyethyldimethoxymethylsilane, τ-methacryloyloxypropylmethoxydimethylsilane, τ-methacryloyloxypropylmethoxydimethylsilane, τ-methacryloyloxypropyldimethoxymethylsilane, τ-methacryloyloxypropylethoxydiethylsilane, τ-methacryloyloxypropyldiethylsilane τ-methacryloyloxypropyldiethoxymethylsilane and δ-methacryloyloxybutyldiethoxymethylsilane. The grafting agent is used usually in an amount of from 0 to 10% by weight in the polyorganosiloxane.

The polyalkyl(meth)acrylate may be prepared using an alkyl (meth)acrylate, a crosslinking agent and a grafting agent. The alkyl (meth)acrylate may be an acryl acrylate such as methyl acrylate, ethyl acrylate, n-propyl acrylate, n-butyl acrylate or 2-ethylhexyl acrylate, or an alkyl methacrylate such as hexyl methacrylate, 2-ethylhexyl methacrylate or n-lauryl methacrylate. It is particularly preferred to use n-butyl acrylate. The crosslinking agent for the alkyl (meth)acrylate may be, for example, ethylene glycol dimethacrylate, propylene glycol dimethacrylate, 1,3-butylene glycol dimethacrylate or 1,4-butylene glycol dimethacrylate. The grafting agent for the alkyl (meth) acrylate may be, for example, allyl methacrylate, triallyl cyanurate or triallyl isocyanurate. Allyl methacrylate can be used alone as a crosslinking agent. The preparation of the polyalkyl(meth)acrylate is well within the scope of one of ordinary skill in the art and does not form part of this invention.

The two components, the polyorganosiloxane and the polyalkyl (meth)acrylate, can be polymerized together to form the impact modifier or the polyalkyl(meth)acrylate can be graft polymerized onto a polyorganosilane rubber in a manner such as for example described by European Patent EP 0308871 A2, incorporated herein by reference. Any other method may be used to combine the two components, including those known within the art. The polymerization of the two components is well within the scope of one of ordinary skill in the art and does not form part of this invention.

The preferred impact modifier contains dimethyl siloxane. Most preferably, the impact modifier comprises a butyl acrylate-methyl methacrylate-poly(dimethyl siloxane) copolymer; an example of such a commercially available polyorganosiloxane impact modifier is Metablen-S-2001 manufactured by the Mitsubishi Rayon Co. and available from Metco North America. Desirably, from about 4 parts to about 12 parts by weight of the impact modifier containing polyorganosiloxane per 100 parts of CPVC are added to the CPVC, in order to obtain the desired properties of low rate of heat release and smoke generation while maintaining good stability and toughness.

The impact modifier containing polyorganosiloxane can be added directly to the CPVC and simultaneously mixed at elevated temperatures. Suitable mixing devices include Henschel, Banbury, a two-roll mill, any type of extrusion mixing, and the like, with suitable temperatures generally being from about 210° C. to about 235° C. and desirably from about 215° C. to about 230° C. Another manner of mixing involves heating the impact modifier containing polyorganosiloxane to an elevated temperature and subsequently blending the same with the CPVC. The preblend can generally be mixed in any conventional mixing apparatus such as a Banbury, a two-roll mill, any type of extruder, and the like, at temperatures as from about 220° C. to about 260° C., with from about 230° C. to about 250° C. being preferred. The subsequent mixing of the preblend with the CPVC can also be carried out in conventional mixing equipment as noted immediately hereinabove and at temperatures of generally from about 210° C. to about 235° C. and preferably from about 215° C. to about 230° C.

Additives can be added to the novel thermoplastic compound as needed. Conventional additives which are well known to the art and to the literature as well as others can be added to the thermoplastic polymer compounds of the present invention. Examples include but are not limited to vinyl stabilizers, antioxidants, lubricants, heat stabilizers, flame retardants, and pigments such as titanium dioxide and carbon black and processing and fusion aids, fillers, and fibrous reinforced impact modifiers.

The following non-limiting examples serve to further illustrate the present invention in greater detail.

EXAMPLES

Four compounds were prepared using two types of CPVC and conventional acrylic impact modifiers and impact modifiers containing polyorganosiloxane. The ingredients of these four compounds are set forth in Table 1.

TABLE 1

| Ingredient | Parts by Wt. Compound #1 | Parts by Wt. Compound #2 | Parts by Wt. Compound #3 | Parts by Wt. Compound #4 |
|---|---|---|---|---|
| Photo-Slurry Resin (70.6% Cl) | 100 | 100 | 100 | — |
| CPVC Resin (71.8% Cl) | — | — | — | 100 |
| Di-butyltin bis-thioglycolate (stabilizer) | 4.0 | 4.0 | 4.0 | 4.0 |
| Methyl methacrylate-butadiene styrene polymer (impact modifier) | 8.0 | — | — | — |
| Methacrylate-butadiene styrene polymer (impact modifier) | — | 8.0 | — | — |

TABLE 1-continued

| Ingredient | Parts by Wt. Compound #1 | Parts by Wt. Compound #2 | Parts by Wt. Compound #3 | Parts by Wt. Compound #4 |
|---|---|---|---|---|
| Impact modifier containing polyorganosiloxane | — | — | 8.0 | 8.0 |
| Oxidized polyethylene (lubricant) | 1.5 | 1.5 | 1.5 | 1.5 |
| Titanium dioxide, rutile (filler) | 5.0 | 5.0 | 5.0 | 5.0 |

The four compounds were subject to ASTM tests for heat distortion (D-648), tensile strength (D-638), tensile modulus (D-638) and Izod Impact (D-256). The results of these tests are set forth in Table 2.

TABLE 2

| Test | Compound #1 | Compound #2 | Compound #3 | Compound #4 |
|---|---|---|---|---|
| Deflection Temperature (ASTM D-648) (° F.) | 227 | 226 | 224 | 263 |
| Tensile Strength (ASTM D-638) (psi) | 8580 | 7120 | 7310 | 7080 |
| Tensile Modulus (ASTM D-638) (psi) | 405,000 | 466,000 | 426,000 | 414,000 |
| Izod Impact (ASTM D-256) (ft-lb/in) | 0.62 | 1.15 | 1.02 | 0.81 |

These test results indicate the novel thermoplastic compound can be made from conventional CPVC resin containing approximately 70% chlorine or from CPVC resin containing approximately 72% chlorine while maintaining the good properties found by Applicants.

Example 2

In this example, conventional acrylic impact modifiers, and conventional butadiene impact modifiers were compared to impact modifiers containing polyorganosiloxane. The recipes set forth in Table 3 were used.

TABLE 3

| Sample | 5 | 6 | 7 | 8 | 9 | 10 |
|---|---|---|---|---|---|---|
| CPVC Resin, 67% Cl | 100 | 100 | 100 | — | — | — |
| CPVC Resin, 70% Cl | — | — | — | 100 | 100 | 100 |
| Tin Stabilizer | 4 | 4 | 4 | 4 | 4 | 4 |
| Waxes | 1.5 | 1.5 | 1.5 | 1.5 | 1.5 | 1.5 |
| TiO$_2$ | 5 | 5 | 5 | 5 | 5 | 5 |
| Butadiene Impact Modifier | 8 | — | — | 8 | — | — |
| Acrylic Impact Modifier | — | 8 | — | — | 8 | — |
| Impact Modifier Containing Polyorganosiloxane | — | — | 8 | — | — | 8 |

These compounds were tested for thermal stability, Brabender torque, notched Izod and oven age appearance. The results from the testing are set forth in Table 4.

TABLE 4

| Tests | 5 | 6 | 7 | 8 | 9 | 10 |
|---|---|---|---|---|---|---|
| Melt Flow Index | 6.5 | 8.4 | 7.6 | 10.0 | 12.2 | 10.8 |
| Dynamic Thermal Stability (ASTM D-2538) | | | | | | |
| time to min. torque | 10.5 | 12.1 | 12.6 | 4.6 | 4.1 | 4.4 |
| torque at minimum temperature | 19.0 | 17.3 | 17.5 | 21.1 | 16.8 | 21.0 |
| | 215 | 215 | 215 | 237 | 236 | 236 |
| Notched Izod (ASTM D-256) | 2.4 | 1.6 | 2.4 | 3.3 | 2.5 | 2.6 |
| Heat Distortion Temperature (° C.) | 98.5 | 99.5 | 100.5 | 112.5 | 112.5 | 112.5 |
| ¾ Inch Fittings, Schedule 40 | | | | | | |
| Quick burst (psi), ASTM D1599 | 1060 | 1340 | 1330 | 900 | 1060 | 1260 |
| Standard deviation (psi) | 105 | 110 | 100 | 170 | 240 | 100 |
| Stock temperature (° F.) | 441 | 445 | 437 | 460 | 452 | 448 |

The novel compound of the present invention containing the polyorganosiloxane impact modifier had improved heat resistance as compared to conventional butadiene impact modifiers. In addition, the thermoplastic compound of the present invention retained good toughness generally found when conventional acrylic impact modifiers are used.

Example 3

The impact modifier containing polyorganosiloxane was compared to conventional acrylic and butadiene impact modifiers in a thermoplastic compound containing CPVC having 67% chlorine level. The ingredients of the 3 compounds formulated below are listed in Table 5.

TABLE 5

| Sample | 11 | 12 | 13 |
|---|---|---|---|
| CPVC Resin, 67% Cl | 100 | 100 | 100 |
| Chlorinated Polyethylene | 4 | 4 | 4 |
| Butyltin stabilizer | 3 | 3 | 3 |
| Titanium Dioxide | 5 | 5 | 5 |
| Oxidized Polyethylene | 1 | 1 | 1 |
| Polyethylene Wax | 0.5 | 0.5 | 0.5 |
| Impact Modifier | | | |
| Acrylic | 6 | | |
| Methacrylate butadiene styrene | | 6 | |
| Polyorganosiloxane | | | 6 |

These compounds were tested for deflection temperature, Brabender Stability and Notched Izod. The results are set forth in Table 6.

TABLE 6

| Exp. No. | 11 | 12 | 13 |
|---|---|---|---|
| Deflection Temp. at 264 psi (ASTM D-648) | 98.5 | 97 | 97.5 |
| Brabender stability time (min.) (ASTM D-2538) | 23.8 | 16.2 | 23.5 |

TABLE 6-continued

| Exp. No. | 11 | 12 | 13 |
|---|---|---|---|
| Notched Izod (ASTM D-256 Method A) (ft. lb./in.) | 1.12 | 3.71 | 2.02 |

Compounds using the impact modifier containing polyorganosiloxane provided superior impact strength in comparison to those containing acrylic modifiers. Moreover, the compound of the instant invention did not suffer the loss in stability as seen with butadiene containing impact modifiers.

Example 4

The following compounds listed in Table 7 were formed to study the effect of the amount of the impact modifier containing polyorganosiloxane on the novel compound of this invention.

TABLE 7

| Experiment No. | 14 | 15 | 16 | 17 | 18 | 19 | 20 | 21 |
|---|---|---|---|---|---|---|---|---|
| CPVC, 63.5% Cl | 100 | 100 | 100 | 100 | 100 | 100 | 100 | 100 |
| Di-octyl tin laurate | 1 | | | | | | | |
| Glycerol monostearate | 1 | | | | | | | |
| Acrylic Impact Modifier | 1 | | | | | | | |
| Acrylic Impact Modifier | 1 | | | | | | | |
| Acrylic Impact Modifier | .5 | | | | | | | |
| Di-octyl tin maleate | 2 | | | | | | | |
| Titanium dioxide | 3 | 5 | 5 | 5 | 5 | 5 | 5 | 10 |
| Impact Modifier containing Polyorganosiloxane | 15 | — | 4 | 6 | 8 | 10 | 12 | 15 |
| Methyl tin | | 3 | 3 | 3 | 3 | 3 | 3 | 3 |
| Acrylic Impact Modifier | | 1 | 1 | 1 | 1 | 1 | 1 | 1 |
| Oxidized polyethylene | | 1 | 1 | 1 | 1 | 1 | 1 | 1 |
| Fatty acid ester | | 1.75 | 1.75 | 1.75 | 1.75 | 1.75 | 1.75 | 1.75 |
| Antimony oxide | | 1.9 | 1.9 | 1.9 | 1.9 | 1.9 | 1.9 | 1.9 |
| Melamine molybdate | | 1.7 | 1.7 | 1.7 | 1.7 | 1.7 | 1.7 | — |
| MBS | | 2.7 | — | — | — | — | — | — |
| Acrylic Impact Modifier | | 2.5 | — | — | — | — | — | — |

These formulations were made, compression molded and tested for rate of heat release, smoke release and toughness. The rate of heat release test by means of the Ohio State University (OSU) rate of heat release calorimeter were performed on samples of the compression molded material having a thickness between 0.060 and 0.065 inch according to ASTM E-906 with a 40K W/m$^2$ radiant. The results are set forth below in Table 8.

TABLE 8

| Experiment No. | 14 | 15 | 16 | 17 | 18 | 19 | 20 | 21 |
|---|---|---|---|---|---|---|---|---|
| Rate of heat release, kW/m$^2$ | | | | | | | | |
| Peak, within 20 minutes | 166 | 96 | 82 | 96 | 106 | 108 | 128 | 134 |
| Total, kW-min/m$^2$ first two minutes FAA requirements | 107 | 31 | 21 | 26 | 22 | 46 | 74 | 122 |
| Rate of smoke release | | | | | | | | |
| Peak, within 20 minutes | 155 | 66 | 44 | 52 | 61 | 76 | 93 | 130 |
| Total, within 20 minutes | 333 | 160 | 80 | 116 | 154 | 197 | 242 | 304 |
| Izod, ft. lbs./in. notched | 13.9 | 0.6 | 0.9 | 1.2 | 1.1 | 8.2 | 12.5 | 13.7 |
| Charpy, ft. lbs./in. | 11.8 | 0.9 | 1.1 | 1.2 | 1.5 | 10.1 | 12.4 | 13.5 |

As the results of Table 8 show, Applicant's novel compound containing from about 4 to about 12 parts of an impact modifier containing polyorganosiloxane has improved stability and toughness and exhibits a low rate of heat release.

Example 5

This example compares the effect of QUV aging at 500 and 1000 hours on the color change and impact resistance of two compounds, one which is formed with an impact modifier containing polyorganosiloxane and the other containing a methyl methacrylate-butadiene styrene impact modifier (MBS). The compound recipes are listed below in Table 9.

TABLE 9

| | 22 | 23 |
|---|---|---|
| CPVC, 63.5% Cl | 100 | 100 |
| Methyl tin | 3 | 3 |

TABLE 9-continued

|  | 22 | 23 |
|---|---|---|
| Impact Modifier Containing Polyorganosiloxane | 15 |  |
| MBS |  | 15 |
| Acrylic Impact Modifier | 1 | 1 |
| Oxidized Polyethylene | 1 | 1 |
| Fatty Acid Ester | 1.5 | 1.5 |
| Antioxidant | 0.25 | 0.25 |
| Titanium dioxide | 10 | 10 |

Eight and one-half pound batches were fluxed in a Banbury and sheeted off a 10 inch by 20 inch mill. Slabs were died from the sheet and compression molded using a five minute preheat and held three minutes at 1500 psi pressure at 370° F.

These compounds were tested for CIE Color Lab Data. The results are set forth in Table 10.

TABLE 10

CIE Lab Color Data

|  |  | 22 | 23 |
|---|---|---|---|
| Yellowness index |  |  |  |
| Original |  | 15.88 | 15.48 |
| 500 hours QUV[5] |  | 14.93 | 20.40 |
| 1000 hours QUV |  | 16.73 | 18.79 |
| CIE LAB |  |  |  |
| Delta L[1] | 500 hours | −.39 | −.32 |
|  | 1000 hours | −.86 | .09 |
| Delta E[2] | 500 hours | 1.05 | 3.05 |
|  | 1000 hours | 1.03 | 2.31 |
| Delta A[3] | 500 hours | .57 | −.55 |
|  | 1000 hours | .54 | −.46 |
| Delta B[4] | 500 hours | −.80 | 3.00 |
|  | 1000 hours | .18 | 2.08 |

[1]Delta L is Lightness/darkness
[2]Delta E is Total color
[3]Delta A is Green−/Red+
[4]Delta B is Yellow/Blue−
[5]340 lamp, 50° C., 4 hours condensation CIE LAB is color measurement of a material by a spectrophotometer that defines color in three dimensional space. CIE is Commission International de l'Eclairage. L indicates lightness or darkness of the color, a indicates the position on the red-green axis, and b indicates the position on the yellow-blue axis (LAB). A spectrophotometer measures light at many points on the visual spectrum.

QUV is an accelerated weathering test using the method of ASTM G-53 that recreates the damage caused by sunlight, rain and dew. It simulates the effect of sunlight with eight fluorescent UV lamps, and simulates rain and dew by the direct condensation of water on the test specimens.

The impact resistance of the compounds in Table 9 was also tested. Results are set forth in Table 11.

TABLE 11

| Compound | 22 | 23 |
|---|---|---|
| Force maximum, lbs. |  |  |
| Original | 1090 | 997 |
| 500 hours QUV | 974 | 947 |
| 1000 hours QUV | 985 | 836 |

TABLE 11-continued

| Compound | 22 | 23 |
|---|---|---|
| Energy initiation, ft. lbs./in. |  |  |
| Original | 177 | 152 |
| 500 hours QUV | 142 | 136 |
| 1000 hours QUV | 141 | 98 |
| Energy total, ft. lbs./in. |  | 250 |
| Original | 266 | 218 |
| 500 hours QUV | 220 | 182 |
| 1000 hours QUV | 222 |  |

The instrument used is a RDT 5000 with 23 pound dart, 0.5 inch diameter tup, 1.0 inch diameter retainer ring, impact velocity of 133 inches per second, tested at 23° C. Samples were compression molded, and results for QUV samples were exposed side down.

The compound with the impact modifier containing polyorganosiloxane generally performs better than the compound containing MBS.

Comparative Example 1

This comparative example compares a CPVC compound containing 15 parts of the impact modifier containing polyorganosiloxane believed to be used in Japan (Experiment No. 1) and Applicant's formulations with an excess amount of the impact modifier containing polyorganosiloxane (Experiment No. 2). Table 12 sets forth the formulations used.

TABLE 12

| Experiment No. | 1 | 2 |
|---|---|---|
| CPVC Resin 63.5% Cl | 100 | 100 |
| Di-octyl tin | 1 | — |
| Glycerol monostearate | 1 | — |
| Acrylic | 1 | — |
| Acrylic | 1 | — |
| Acrylic | .5 | — |
| Di-octyl tin maleate | 2 | — |
| Titanium dioxide | 3 | 10 |
| Impact Modifier Containing Polyorganosiloxane | 15 | 15 |
| Methyl tin | — | 3 |
| Acrylic | — | 1 |
| Oxidized polyethylene | — | 1 |
| Fatty acid ester | — | 1.5 |
| Hindered phenolic AO | — | .25 |

These two compounds were tested for physical properties, aging and thermal stability. The test results are set forth below in Table 13.

TABLE 13

| Experiment No. |  | 1 | 2 |
|---|---|---|---|
| Physical properties |  |  |  |
| Izod ⅛ inch ft. lb./in. | Compression molded | 13.9 | 11.7 |
| Charpy ⅛ inch ft. lb.in. | Compression molded | 11.8 | 7.3 |
| Haake DTS |  |  |  |
| DTS Time, min | Cubes | 6.8 | 12.0 |
| Minimum torque, meter/grams |  | 1047 | 1036 |
| Stock temp. at DTS, ° C. |  | 223 | 224 |

TABLE 13-continued

| Experiment No. | | 1 | 2 |
|---|---|---|---|
| QUV, ASTM G-53 | | | |
| CIE Lab | | | |
| Yellowness Index | Unaged | 23.1 | 17.3 |
| | Aged 500 hours | 15.5 | 12.8 |
| | Aged 1000 hours | 21.3 | 12.8 |

Applicant's novel compound containing an excess of the polyorganosiloxane impact modifier had much better physical properties as well as thermal stability as compared to the compound in Experiment No. 1 of this example. Moreover, Applicant's compound did not turn yellow after aging as compared to the Japanese compound.

In summary, novel thermoplastic polymer compounds have been described. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims and all equivalents.

We claim:

1. A thermoplastic polymer composition comprising:
   (a) chlorinated polyvinyl chloride in an amount of at least 90% by weight per 100 parts by weight of polymer resin in the composition;
   (b) at least one impact modifier in an amount of at least four parts by weight and not greater than about 12 parts by weight per 100 parts of polymer resin in the composition, wherein said at least one impact modifier comprises polyalkyl(meth)acrylate and polyorganosiloxane, and wherein compounds made from the thermoplastic polymer composition have a rate of heat release and a rate of smoke generation lower than rates of heat release and smoke generation for chlorinated polyvinyl chloride thermoplastic polymer compounds comprising only an acrylic impact modifier, wherein said acrylic impact modifier does not contain polyorganosiloxane.

2. A thermoplastic polymer composition in accordance with claim 1 wherein at least one impact modifier comprises polyalkyl(meth)acrylate polymerized with polyorganosiloxane.

3. A thermoplastic polymer composition in accordance with claim 1 wherein at least one impact modifier comprises dimethyl siloxane.

4. A thermoplastic polymer composition in accordance with claim 1, wherein at least one impact modifier comprises a butyl acrylate-methyl methacrylate-poly(dimethyl siloxane) copolymer.

5. A thermoplastic polymer composition in accordance with claim 1 further comprising polyvinyl chloride in an amount not greater than 10% by weight per 100 parts by weight of polymer resin in the composition.

6. A thermoplastic polymer composition in accordance with claim 1 further comprising a chlorinated polyvinyl chloride polymer blend in an amount of not greater than 10% by weight per 100 parts by weight of polymer resin in the composition.

7. An article made from a thermoplastic polymer composition comprising:
   (a) chlorinated polyvinyl chloride in an amount of at least 90% by weight per 100 parts by weight of polymer resin in the composition;
   (b) at least one impact modifier, in an amount of at least four parts by weight and not greater than about 12 parts by weight per 100 parts of polymer resin in the composition, wherein said impact modifier comprises polyalkyl(meth)acrylate and polyorganosiloxane, wherein the article has a rate of heat release and a rate of smoke generation that are lower than rates of heat release and smoke generation for articles made from chlorinated polyvinyl chloride thermoplastic polymer compounds comprising only an acrylic impact modifier, wherein said acrylic impact modifier does not contain polyorganosiloxane.

8. An article in accordance with claim 7 made from a thermoplastic polymer composition further comprising polyvinyl chloride in an amount not greater than 10% by weight per 100 parts by weight of polymer resin in the composition.

9. An article in accordance with claim 7 made from a thermoplastic polymer composition further comprising a chlorinated polyvinyl chloride polymer blend in an amount not greater than 10% by weight per 100 parts by weight of polymer resin in the composition.

10. An article in accordance with claim 7 made from a thermoplastic polymer composition wherein at least one impact modifier comprises polyalkyl(meth)acrylate polymerized with polyorganosiloxane.

11. A thermoplastic polymer composition comprising:
    (a) chlorinated polyvinyl chloride in an amount of at least 90% by weight per 100 parts by weight of polymer resin in the composition;
    (b) at least one impact modifier in an amount of at least four parts by weight and not greater than about 12 parts by weight per 100 parts of polymer resin in the composition, wherein said at least one impact modifier comprises polyalkyl(meth)acrylate and polyorganosiloxane;

wherein said chlorinated polyvinyl chloride is blended with said at least one impact modifier, and wherein compounds made from the thermoplastic polymer composition have a rate of heat release and a rate of smoke generation lower than rates of heat release and smoke generation for chlorinated polyvinyl chloride thermoplastic polymer compounds comprising only an acrylic impact modifier, wherein said acrylic impact modifier does not contain polyorganosiloxane.

12. A thermoplastic polymer composition in accordance with claim 11, wherein at least one impact modifier comprises polyalkyl(meth)acrylate polymerized with polyorganosiloxane.

13. A thermoplastic polymer composition in accordance with claim 11, wherein at least one impact modifier comprises a butyl acrylate-methyl methacrylate-poly(dimethyl siloxane) copolymer.

14. A thermoplastic polymer composition in accordance with claim 11, further comprising polyvinyl chloride in an amount not greater than 10% by weight per 100 parts by weight of polymer resin in the composition.

15. A thermoplastic polymer composition in accordance with claim 11, further comprising a chlorinated polyvinyl chloride polymer blend in an amount of not greater than 10% by weight per 100 parts by weight of polymer resin in the composition.

16. An article made from a thermoplastic polymer composition comprising:
    (a) chlorinated polyvinyl chloride in an amount of at least 90% by weight per 100 parts by weight of polymer resin in the composition;
    (b) at least one impact modifier, in an amount of at least four parts by weight and not greater than about 12 parts by weight per 100 parts of polymer resin in the composition, wherein said impact modifier comprises polyalkyl(meth)acrylate and polyorganosiloxane;

wherein said chlorinated polyvinyl chloride and said at least one impact modifier are blended; and wherein the article has a rate of heat release and a rate of smoke generation that are lower than rates of heat release and smoke generation for articles made from chlorinated polyvinyl chloride thermoplastic polymer compounds comprising only an acrylic impact modifier, wherein said acrylic impact modifier does not contain polyorganosiloxane.

17. An article in accordance with claim 16 made from a thermoplastic polymer composition further comprising polyvinyl chloride in an amount not greater than 10% by weight per 100 parts by weight of polymer resin in the composition.

18. An article in accordance with claim 16 made from a thermoplastic polymer composition further comprising a chlorinated polyvinyl chloride polymer blend in an amount not greater than 10% by weight per 100 parts by weight of polymer resin in the composition.

19. An article in accordance with claim 16 made from a thermoplastic polymer composition wherein at least one impact modifier comprises polyalkyl(meth)acrylate polymerized with polyorganosiloxane.

* * * * *